(12) United States Patent
Liu et al.

(10) Patent No.: US 9,607,509 B2
(45) Date of Patent: Mar. 28, 2017

(54) IDENTIFICATION OF VEHICLE PARKING USING DATA FROM VEHICLE SENSOR NETWORK

(71) Applicants: Jing Liu, Nanjing (CN); Junpeng Hu, Nanjing (CN); Yinling Ni, Shanghai (CN); Yongxun Li, Shanghai (CN); Siyi Chen, Shanghai (CN); Jun Liu, Nanjing (CN)

(72) Inventors: Jing Liu, Nanjing (CN); Junpeng Hu, Nanjing (CN); Yinling Ni, Shanghai (CN); Yongxun Li, Shanghai (CN); Siyi Chen, Shanghai (CN); Jun Liu, Nanjing (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/681,122

(22) Filed: Apr. 8, 2015

(65) Prior Publication Data
US 2016/0300486 A1 Oct. 13, 2016

(51) Int. Cl.
*G08G 1/00* (2006.01)
*G08G 1/01* (2006.01)
*G08G 1/017* (2006.01)
*G01S 1/02* (2010.01)

(52) U.S. Cl.
CPC .......... *G08G 1/0125* (2013.01); *G01S 1/026* (2013.01); *G08G 1/017* (2013.01); *G08G 1/0116* (2013.01)

(58) Field of Classification Search
CPC combination set(s) only.
See application file for complete search history.

(56) References Cited

U.S. PATENT DOCUMENTS

| 4,817,166 | A | 3/1989 | Gonzalez et al. |
| 6,081,206 | A * | 6/2000 | Kielland ............ G06Q 30/0284 194/902 |
| 6,340,935 | B1 * | 1/2002 | Hall ...................... G08G 1/14 340/905 |
| RE38,626 | E * | 10/2004 | Kielland ................ G07B 15/02 194/902 |
| 6,801,850 | B1 | 10/2004 | Wolfson |
| 6,803,854 | B1 * | 10/2004 | Adams .................... G08G 1/127 340/425.5 |
| 6,965,325 | B2 | 11/2005 | Finnern |
| 7,606,583 | B2 | 10/2009 | Spriestersbach |
| 7,840,319 | B2 | 11/2010 | Zhong |
| 7,877,182 | B2 | 1/2011 | Dix et al. |
| 7,969,306 | B2 | 6/2011 | Ebert et al. |
| 8,120,513 | B2 | 2/2012 | Ioli |
| 8,292,171 | B2 | 10/2012 | Granruth et al. |
| 8,520,695 | B1 * | 8/2013 | Rubin ...................... G08G 9/02 370/337 |
| 8,799,036 | B1 * | 8/2014 | Christensen ............ G07C 5/00 340/438 |
| 9,104,537 | B1 * | 8/2015 | Penilla .................... G06F 17/00 |

(Continued)

*Primary Examiner* — Jonathan L Sample
(74) *Attorney, Agent, or Firm* — Horizon IP Pte. ltd.

(57) ABSTRACT

A framework for identifying parking areas from vehicle trajectory data is described herein. Vehicle trajectory data collected from a sensor network having a plurality of sensor stations for detecting vehicles is provided. The vehicle trajectory data is pre-processed to generate a tracking table of vehicles and analyzed to determine an interstation parking area between first and second sensor stations of interest based on input parameters from a user.

20 Claims, 9 Drawing Sheets

(56) References Cited

U.S. PATENT DOCUMENTS

| | | | | |
|---|---|---|---|---|
| 9,330,303 B2* | 5/2016 | Nerayoff | | H04N 7/181 |
| 9,330,567 B2* | 5/2016 | Ricci | | G06F 9/54 |
| 2003/0069665 A1* | 4/2003 | Haag | | G08G 1/146 |
| | | | | 700/217 |
| 2003/0210139 A1* | 11/2003 | Brooks | | B64F 1/368 |
| | | | | 340/531 |
| 2005/0068196 A1* | 3/2005 | Marin | | G07B 15/00 |
| | | | | 340/932.2 |
| 2006/0026017 A1* | 2/2006 | Walker | | H04L 63/302 |
| | | | | 701/31.4 |
| 2006/0200307 A1* | 9/2006 | Riess | | G06K 9/00785 |
| | | | | 701/408 |
| 2008/0258880 A1 | 10/2008 | Smith et al. | | |
| 2009/0024309 A1 | 1/2009 | Crucs | | |
| 2010/0142448 A1* | 6/2010 | Schlicht | | H04W 4/20 |
| | | | | 370/328 |
| 2010/0253492 A1* | 10/2010 | Seder | | G01S 13/723 |
| | | | | 340/435 |
| 2010/0253597 A1* | 10/2010 | Seder | | B60R 1/00 |
| | | | | 345/7 |
| 2012/0116825 A1 | 5/2012 | Gallais et al. | | |
| 2012/0190380 A1* | 7/2012 | Dupray | | G01S 1/026 |
| | | | | 455/456.1 |
| 2013/0057686 A1* | 3/2013 | Genc | | B60R 1/00 |
| | | | | 348/148 |
| 2013/0059607 A1* | 3/2013 | Herz | | H04L 67/20 |
| | | | | 455/456.3 |
| 2013/0107041 A1* | 5/2013 | Norem | | H04N 5/225 |
| | | | | 348/143 |
| 2013/0138591 A1* | 5/2013 | Ricci | | G06F 9/54 |
| | | | | 706/46 |
| 2013/0266190 A1* | 10/2013 | Wang | | G06K 9/3258 |
| | | | | 382/105 |
| 2013/0279392 A1* | 10/2013 | Rubin | | H04W 72/005 |
| | | | | 370/312 |
| 2013/0279491 A1* | 10/2013 | Rubin | | G08G 1/166 |
| | | | | 370/347 |
| 2014/0036076 A1* | 2/2014 | Nerayoff | | H04N 7/181 |
| | | | | 348/148 |
| 2014/0058805 A1 | 2/2014 | Paesler et al. | | |
| 2014/0113619 A1* | 4/2014 | Tibbitts | | G07C 5/008 |
| | | | | 455/419 |
| 2014/0140578 A1* | 5/2014 | Ziola | | G06Q 10/10 |
| | | | | 382/105 |
| 2014/0180566 A1 | 6/2014 | Malhotra | | |
| 2014/0195138 A1* | 7/2014 | Stelzig | | G08G 1/0116 |
| | | | | 701/119 |
| 2014/0195281 A1* | 7/2014 | Stefik | | G06Q 10/02 |
| | | | | 705/5 |
| 2014/0200970 A1* | 7/2014 | Nerayoff | | H04N 7/181 |
| | | | | 705/13 |
| 2014/0210646 A1* | 7/2014 | Subramanya | | B61L 29/28 |
| | | | | 340/928 |
| 2014/0278074 A1* | 9/2014 | Annapureddy | | G01C 21/3453 |
| | | | | 701/468 |
| 2014/0309866 A1* | 10/2014 | Ricci | | B60Q 1/00 |
| | | | | 701/36 |
| 2014/0310277 A1* | 10/2014 | Ricci | | H04W 48/04 |
| | | | | 707/736 |
| 2014/0358414 A1 | 12/2014 | Ibrahim et al. | | |
| 2015/0063646 A1* | 3/2015 | Wang | | G06K 9/00812 |
| | | | | 382/104 |
| 2015/0077550 A1* | 3/2015 | Apelbaum | | H04N 7/181 |
| | | | | 348/143 |
| 2015/0112730 A1* | 4/2015 | Binion | | G07C 5/008 |
| | | | | 705/4 |
| 2015/0112731 A1* | 4/2015 | Binion | | G06Q 40/08 |
| | | | | 705/4 |
| 2015/0120336 A1* | 4/2015 | Grokop | | B60W 40/09 |
| | | | | 705/4 |
| 2015/0141043 A1* | 5/2015 | Abramson | | G01C 21/34 |
| | | | | 455/456.1 |
| 2015/0168174 A1* | 6/2015 | Abramson | | G01C 21/3697 |
| | | | | 701/408 |
| 2015/0210287 A1* | 7/2015 | Penilla | | B60W 40/08 |
| | | | | 701/49 |
| 2015/0232065 A1* | 8/2015 | Ricci | | B60R 25/01 |
| | | | | 701/36 |
| 2015/0332097 A1* | 11/2015 | Bulan | | G06T 7/2033 |
| | | | | 382/103 |
| 2016/0117866 A1* | 4/2016 | Stancato | | G07B 15/00 |
| | | | | 705/5 |
| 2016/0180705 A1* | 6/2016 | Liu | | G08G 1/0125 |
| | | | | 701/117 |

* cited by examiner

| | DEVID | CAP_TIME | STATION_NO |
|---|---|---|---|
| 1 | xyz | Feb 1, 2014 4:16:14.0 PM | 00006330 |
| 2 | xyz | Feb 1, 2014 4:18:33.0 PM | 00006029 |
| 3 | xyz | Feb 1, 2014 4:20:31.0 PM | 00006025 |
| 4 | xyz | Feb 1, 2014 4:23:47.0 PM | 00006548 |
| 5 | xyz | Feb 1, 2014 4:35:08.0 PM | 00006452 |
| 6 | xyz | Feb 1, 2014 4:35:45.0 PM | 00006450 |
| 7 | xyz | Feb 1, 2014 8:23:47.0 PM | 00006449 |
| 8 | xyz | Feb 1, 2014 8:42:39.0 PM | 00006236 |
| 9 | xyz | Feb 1, 2014 8:52:18.0 PM | 00006434 |
| 10 | xyz | Feb 1, 2014 9:13:35.0 PM | 00006434 |

| | DEVID | CAP_TIME | NEXT_CAP_TIME | STATION_NO | NEXT_STATION_NO |
|---|---|---|---|---|---|
| 1 | xyz | Feb 1, 2014 4:16:14.0 PM | Feb 1, 2014 4:18:33.0 PM | 00006330 | 00006029 |
| 2 | xyz | Feb 1, 2014 4:18:33.0 PM | Feb 1, 2014 4:20:31.0 PM | 00006029 | 00006025 |
| 3 | xyz | Feb 1, 2014 4:20:31.0 PM | Feb 1, 2014 4:23:47.0 PM | 00006025 | 00006548 |
| 4 | xyz | Feb 1, 2014 4:23:47.0 PM | Feb 1, 2014 4:35:08.0 PM | 00006548 | 00006452 |
| 5 | xyz | Feb 1, 2014 4:35:08.0 PM | Feb 1, 2014 4:35:45.0 PM | 00006452 | 00006450 |
| 6 | xyz | Feb 1, 2014 8:23:47.0 PM | Feb 1, 2014 8:42:39.0 PM | 00006450 | 00006236 |
| 7 | xyz | Feb 1, 2014 8:42:39.0 PM | Feb 1, 2014 8:52:18.0 PM | 00006236 | 00006434 |
| 8 | xyz | Feb 1, 2014 8:52:18.0 PM | Feb 1, 2014 9:13:35.0 PM | 00006434 | 00006434 |

IDENTIFICATION OF VEHICLE PARKING USING DATA FROM VEHICLE SENSOR NETWORK

TECHNICAL FIELD

The present disclosure relates to computer systems, and more specifically, to a framework for identifying vehicle parking area based on vehicle trajectory data from a vehicle sensor network.

BACKGROUND

Road traffic sensor networks have been widely used as a source for traffic investigation and analysis. For example, vehicle data from these sensor networks have been used to detect traffic congestion and real-time traffic flow monitoring. Sensor networks may include sensor stations for detecting vehicles. The sensor stations, for example, may be sparsely distributed within the networks. The sparsity of the sensor stations may be due to cost or other constraints. The sparsity of the sensor stations practically make it impossible to determine detailed information on traveling behaviour within two consecutive stations along a vehicle's trajectory.

There may be instances where detailed information or behaviour of a vehicle between two consecutive sensor stations may be of interest. For example, identifying parking locations of a vehicle between two stations may be of interest such as in the case of locating an individual associated with the vehicle. However, such identification is practically impossible due to sparsity of sensor stations.

From the foregoing discussion, it is desirable to determine travel behaviour of a vehicle between two sensor stations such as parking areas.

SUMMARY

A framework for identifying parking areas from vehicle trajectory data is described herein. In accordance with one aspect, the framework includes a computer-implemented method. The method includes providing vehicle trajectory data collected from a sensor network having a plurality of sensor stations for detecting vehicles. The sensor stations of the sensor network are distributed in a geographical area of interest. The vehicle trajectory data is stored as vehicle trajectory data records in a vehicle trajectory table. A vehicle trajectory data record of the vehicle trajectory data includes a vehicle id identifying the vehicle detected, a sensor station id identifying the sensor station detecting the vehicle, and a captured time which is the time that the sensor station detected the vehicle. The vehicle trajectory data records are pre-processed to generate a tracking table of vehicles. The tracking table is stored in a data model of an analyzer of an analysis system. The data model is analyzed to determine an interstation parking area between first and second sensor stations of interest based on input parameters from a user.

In another aspect, a parking area analysis system is disclosed. The system includes a data storage module for storing a vehicle trajectory table. The vehicle trajectory table includes vehicle trajectory data records collected from a sensor network having a plurality of sensor stations for detecting vehicles. The sensor stations of the sensor network are distributed in a geographical area of interest. A vehicle trajectory data record includes a vehicle id identifying the vehicle detected, a sensor station id identifying the sensor station detecting the vehicle, and a captured time which is the time that the sensor station detected the vehicle. The system includes a pre-processor for analyzing the vehicle trajectory data set to generate a tracking table of vehicles. The tracking table is stored in a data model. The system includes an analyzer for analyzing the data model to determine an interstation parking area between first and second sensor stations of interest based on input parameters from a user. The parking area is disposed within a convex hull surrounding the first and second sensor stations.

In yet another aspect, a non-transitory computer-readable medium having stored thereon program code is disclosed. The program code executable by a computer for identifying parking areas. Vehicle trajectory data collected from a sensor network having a plurality of sensor stations for detecting vehicles is provided. The sensor stations of the sensor network are distributed in a geographical area of interest. The vehicle trajectory data is stored as vehicle trajectory data records in a vehicle trajectory table. A vehicle trajectory data record of the vehicle trajectory data includes a vehicle id identifying the vehicle detected, a sensor station id identifying the sensor station detecting the vehicle, and a captured time which is the time that the sensor station detected the vehicle. The vehicle trajectory data records are pre-processed to generate a tracking table of vehicles. The tracking table is stored in a data model of an analyzer of an analysis system. The data model is analyzed to determine an interstation parking area between first and second sensor stations of interest based on input parameters from a user. The parking area is disposed within a convex hull surrounding the first and second sensor stations.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIG. 4 shows an exemplary embodiment of a table containing data records from a specified vehicle;

FIG. 6 shows an exemplary tracking table containing data records from a specified vehicle;

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for identifying behaviour of a vehicle within a vehicle's trajectory between two consecutive sensor stations. In one implementation, the framework employs an origin-destination (OD) analysis of a vehicle's trajectory and divides it into individual OD trips. For example, a vehicle's trajectory may include multiple trips. The framework may analyze a trajectory of a vehicle and determine multiple ODs from it.

In one implementation, the OD analysis determines two consecutive sensor stations corresponding to the end of one trip and the beginning of the next trip. For example, the OD analysis determines an end station of one trip and the start or begin station of another trip. The OD analysis determines end station and start station. The segment between the end and start stations of two consecutive trips may correspond to a terminal segment of a vehicle's trajectory. In one implementation, the framework identifies parking locations of the vehicle surrounding the terminal segment. Identifying other aspects of travel behaviour of a vehicle may also be useful.

In one implementation, the framework may continuously collect vehicle trajectory data for analysis. The vehicle trajectory data is collected from a sensor network. The data is analyzed. The data, for example, may be analyzed offline. Providing on-line or real time analysis of vehicle trajectories may also be useful.

As will be discussed herein, vehicles, for example, may refer to any type of vehicles of interest captured by the sensor network. For example, vehicles of interest may be cars, motorcycles, vans or other types of vehicles. It should be appreciated that the framework described herein may be implemented as a method, a computer-controlled apparatus, a computer process, a computing system or as an article of manufacture such as a computer-usable medium. These and various other features will be apparent from the following description.

Figure 1:
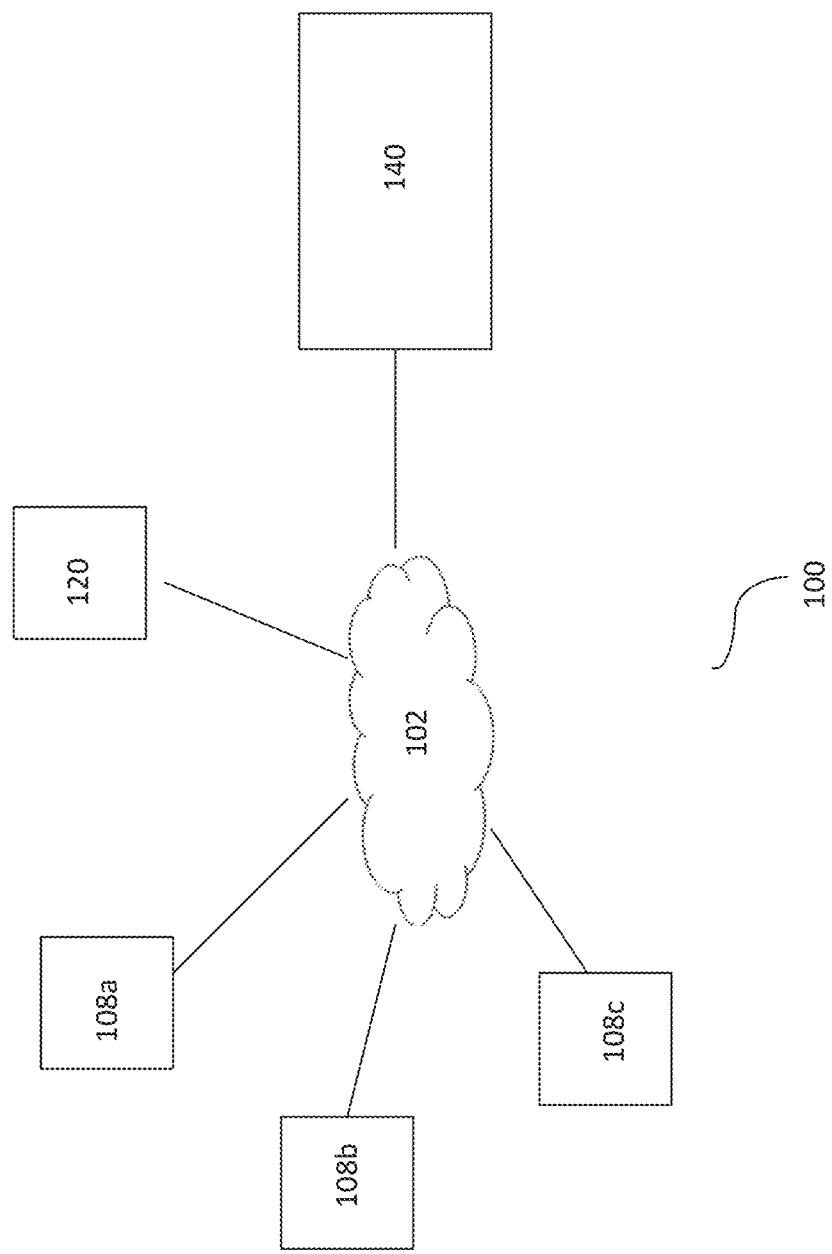
FIG. 1 shows a simplified diagram of an exemplary analysis environment.

FIG. 1 shows a simplified diagram of an exemplary analysis environment 100. The environment 100, for example, analyzes collected trajectory data of vehicles within a geographical area of interest. The geographical area of interest, for example, may be a city or town. Other types of geographical areas may also be useful. The analysis environment facilitates determining behaviour of a vehicle in the vehicle's trajectory. In one implementation, the analysis environment is employed to identify parking areas of a vehicle of interest. The parking areas, for example, are surrounding a terminal segment a vehicle's trajectory between two consecutive trips.

As shown, the environment includes a data collection unit 120 and an analysis system 140. The data collection unit includes a sensor network of sensor stations distributed in a geographical area of interest for capturing vehicle information. In one implementation, a sensor station includes a fixed traffic sensor. Fixed traffic sensors may include radio-frequency identification (RFID) sensors and license plate recognition (LPR) sensors. Other types of fixed traffic sensors may also be useful. A sensor station may include one or both types of sensors. For example, a traffic station may include either a RFID sensor or a LPR sensor or both types of sensors. Other configurations of sensor stations may also be useful. It is understood that the sensor stations may be configured differently. In the case of a sensor station which includes both types of sensors, for example RFID and LPR sensors, data from each sensor may be stored and processed separately.

An RFID sensor captures information from vehicles equipped with RFID transmitters when they pass the sensor. For example, vehicle information is transmitted by the RFID transmitter. When a vehicle passes an RFID sensor, the RFID sensor reads the information transmitted. An LPR sensor, on the other hand, detects a vehicle and captures the license plate of that vehicle. For example, an LPR sensor may include a camera which detects and captures an image of a vehicle passing it. The image is then processed using an image recognition processor. The processor recognizes and extracts the license plate number of that vehicle from the image. The image recognition processor may be integrated into the sensor network or part of the sensor station for local processing. Other configurations of LPR sensors may also be useful. For example, the image recognition processor may performed remotely from the sensor station for remote processing.

Data collected by the sensor network is provided to the trajectory analysis system 140 for analysis. This data can be provided for offline analysis. For example, the data collected may be stored locally and subsequently downloaded to a central storage for offline analysis. Alternatively, the data may be provided for online analysis. For example, the captured data may be streamed to the analysis system for online analysis. Streaming may be achieved using, for example, SAP Event Stream Processor (ESP) from SAP SE. Other types of streaming systems may also be useful.

The data collected by the sensors includes vehicle trajectory data. The vehicle trajectory data is a structured spatial-temporal data. For example, vehicle trajectory data includes a vehicle identifier or id ($v_{id}$), a sensor id ($x_{id}$) and a time stamp (t). For example, the vehicle trajectory data may be ($v_{id}$, $x_{id}$, t). The vehicle id identifies the vehicle which is captured by the sensor, sensor id indicates the sensor station at which the vehicle was captured and time stamp indicates the time when the vehicle was captured by the sensor. A table may be provided with location information associated with the sensor stations. In one implementation, the location information provided is two dimensional. The location (loc) information includes longitude (lon) and latitude (lat) coordinates of the sensor station. For example, location information may be (lon, lat). Other types of location information may also be useful. In some implementations, the sensor id may be replaced with location information. For example, the vehicle trajectory data may include ($v_{id}$, loc, t) or ($v_{id}$, lon, lat, t) instead of ($v_{id}$, $x_{id}$, t).

The analysis system may act as a server and operate in a networked environment with user devices 108a-c and the data collection unit 120. For example, the analysis system may have a distributed architecture, such as a client-server architecture. Other types of architectures may also be useful. A server may include one or more computers or servers. A computer includes a memory and a processor. Various types of computers may be employed for the server. For example, the computer may be a mainframe, a workstation as well as other types of processing devices. The memory of a computer may include any memory or database module. The memory may be volatile or non-volatile types of non-transitory computer-readable media such as magnetic media, optical media, random access memory (RAM), read-only memory (ROM), removable media, or any other suitable local or remote memory component. The computers or servers are connected through a communication network such as internet, intranet, local area network (LAN), wide area network (WAN) or a combination thereof. The servers, for example, are part of the same private network. The servers may be located in single or multiple locations.

As for user devices 108a-c, the devices may be any local computing devices with, for example, a local memory and a processor. The memory may be volatile or non-volatile types of non-transitory computer-readable media such as magnetic media, optical media, random access memory (RAM), read-only memory (ROM), removable media, or any other suitable local or remote memory component. Various types of processing devices may serve as an end-user device. For example, the end-user device may be a PC, a tablet PC, a workstation, a network computer or a mobile computing device, such as a laptop, a tablet or a smart phone. Other types of processing devices may also be used.

The various components of the network may be connected through a communication network 102. For example, components of the network may be connected by an internet, intranet, LAN, WAN or a combination thereof. Other type of networks or network connections may also be useful. For example, network connections may include a WIFI or a 3G/4G/LTE connection. In some cases, the network may be a cloud.

A user may connect to the server using a user device. For example, a user device may include a browser for connecting to the analysis system. The user device may be referred to as the client side while the analysis system may be referred to as the server side. Other types of configurations for the analysis system may also be useful.

The analysis system may include a data source. The data source may be, for example, a database. In one implementation, the data source is a SAP HANA database from SAP SE. Other types of databases may also be useful. The database, for example, may be a database server. The data source stores the vehicle trajectory data collected by the sensor unit.

The analysis system 140 analyzes vehicle trajectory data in a geographical location of interest. The analysis system may be an analysis server. The analysis server and the database server, for example, are separate servers. For example, the analysis system may include a database server and an analysis server. Providing the data source and analysis system on the same server may also be useful. Other configurations of the analysis system may also be useful. In one implementation, a relational database or SQL-based database, such as SAP HANA is used to serve as the database and analysis system. Other configurations of data source and analysis system may also be useful.

Figure 2:
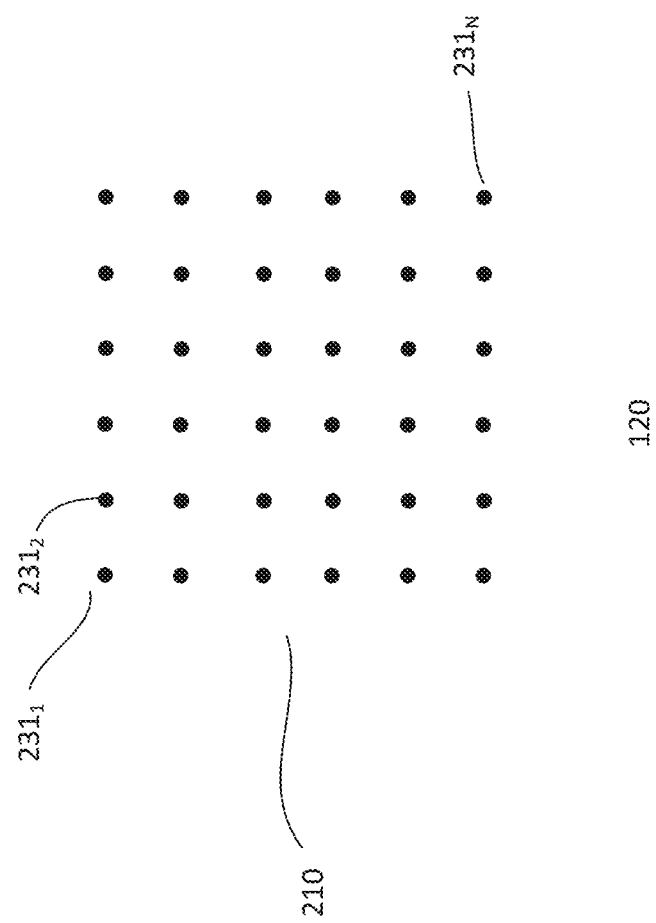
FIG. 2 shows an exemplary embodiment of a sensor network.

FIG. 2 shows a simplified embodiment of a sensor network 120. The sensor network includes a plurality of sensor stations $231_1$-$231_N$ distributed in the geographical area of interest. For example, N number of sensor stations are distributed in the geographical area of interest. The geographical area of interest may be a city or a town. Other types of geographical area of interest may also be useful. For example, the geographical area may be of any size or type of area in which traffic pattern or density is of interest. In one implementation, sensor stations include fixed traffic sensors for capturing vehicle information. In one implementation, the sensors include RFID, LPR or a combination of both types of sensors. For example, a sensor station may be an RFID sensor station, an LPR sensor station or a combined RFID/LPR sensor station. Other types of fixed traffic sensors may also be useful.

As shown, the sensor stations 210 are distributed in a grid arrangement for illustration purposes only. It is understood that the sensor states are located proximate to streets within the geographical area of interest to capture vehicle spatial-temporal information. Streets may include any thoroughfare which a vehicle may access. For example, streets may include roads, avenues and highways. Other types of thoroughfare accessible by vehicles are also included. As such, the sensor stations may have a pattern which is based on the streets and need not be equal distance from adjacent sensor stations. For example, a distance between sensor stations may range from 3-20 kilometers (km). Providing other distances between sensors may also be useful. However, closer stations result in higher granularity of data which will produce more data to analyze.

Information captured by the sensor stations, as discussed, includes spatial-temporal information or data. A sensor station has an associated sensor id ($x_{id}$). The spatial information of a captured vehicle is known through the sensor id. When a vehicle is captured by a sensor station, the sensor station generates spatial-temporal data of the captured vehicle. For example, the data includes (i) a sensor id ($x_{id}$) which indicates location, (ii) a vehicle id ($v_{id}$) which indicates the vehicle, and (iii) time (t) which indicates when the vehicle was captured. Data generated by the sensor network includes trajectory data of all vehicles traveling within the geographical area of interest.

The trajectory data provides an ordered sequence of spatial and temporal sampling points along a vehicle's trajectory. For example, a vehicle trajectory will be an ordered sequence of points from $\{(x_1, t_1), \ldots, (x_i, t_i), (x_{i+1}, t_{i+1}), \ldots, (x_N, t_N)\}$, where $x_i$ is the spatial location provided by, for example, sensor id at time $t_i$ for any i=1 (first entry of the trajectory) to N (last entry of the trajectory). As discussed, $v_{id}$ is also included in trajectory data. The trajectory data may serve as historical data for analysis. For example, trajectory data may be segmented into daily data, weekly data or monthly data. Segmenting the data into other granularities may also be useful.

Figure 3:
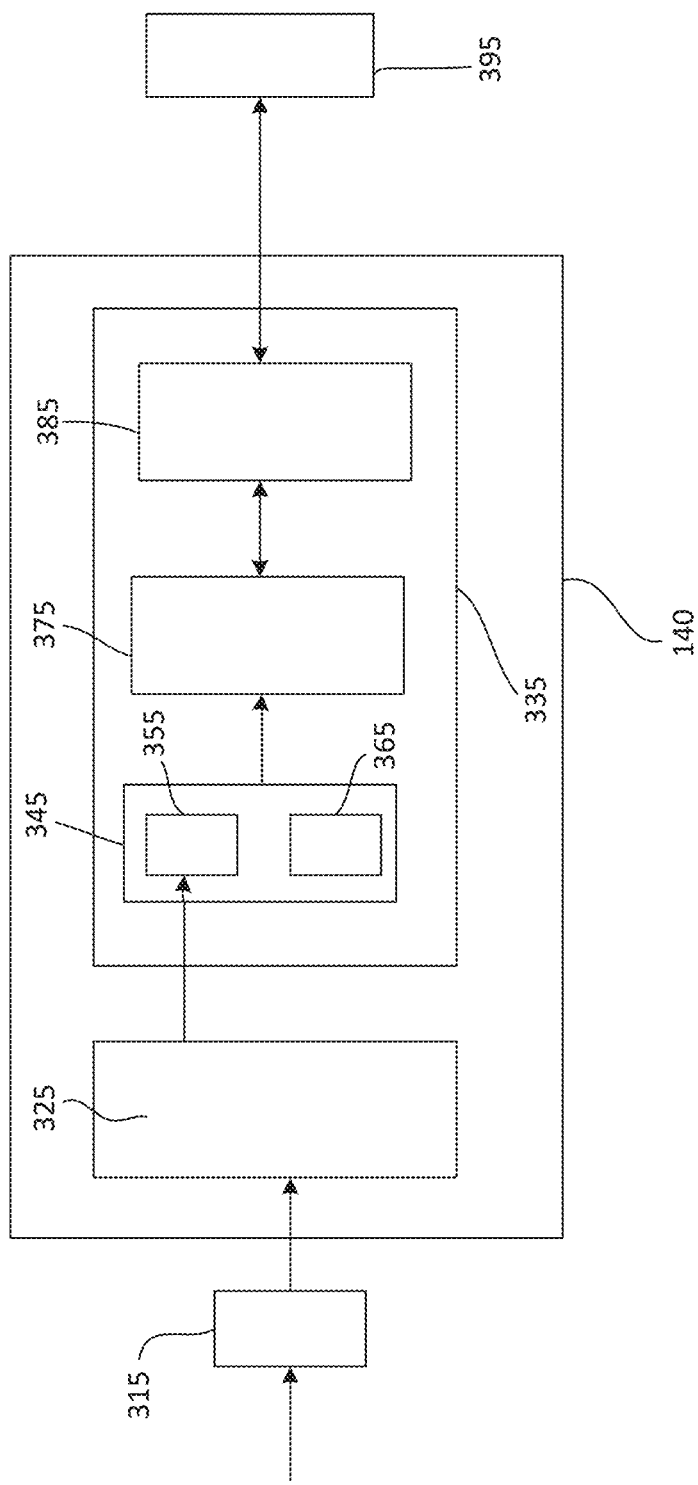
FIG. 3 shows a block diagram of an embodiment of an analysis system.

FIG. 3 shows a block diagram of an embodiment of an analysis system 140. The analysis system, for example, may be a web-based system. The web-based system may be accessed using a web browser 395 on an end-user device. The system, for example, receives vehicle trajectory from a data storage module 315 for processing. The data storage module stores data from the vehicle sensor network. For example, the data storage module stores raw vehicle trajectory data from the sensor network with fixed sensor stations. The raw data, for example, includes vehicle spatial-temporal data captured by the sensor network. An entry, for example, includes ($v_{id}$, t, $x_{id}$). Table 1 shows an exemplary data structure of a data record:

TABLE 1

| Name | Type | Comment |
| --- | --- | --- |
| ID | VARCHAR | Identification of vehicle |
| CAP_TIME | SECONDDATE | Time of capture |
| STATION_NO | VARCHAR | Identification of sensor station |

For example, ID corresponds to $v_{id}$, CAP_TIME corresponds to t, and STATION_NO corresponds to $x_{id}$.

Spatial information may be provided in separate geographical records. For example, a geographical record may include geographical information of a sensor station. Table 2 shows an exemplary data structure of a geographical record of a sensor station:

TABLE 2

| Name | Type | Comment |
| --- | --- | --- |
| STATION_NO | VARCHAR | Identification of the sensor station |
| LAT | DOUBLE | latitude |
| LNG | DOUBLE | longitude |

Geographical records are provided for each sensor station. Providing other types of data record formats may also be useful. For example, data records may include geographic information with a format ($v_{id}$, lon, lat, t). In such cases, separate geographical records are not needed.

The storage module, as described, stores data collected by the sensor network. The data is provided to the analysis system. Each new data collected is stored and provided to the analysis system. The data, for example, stored in a vehicle trajectory table or a vehicle data table. In some embodiments, data collected may be provided directly to the analysis system. Other configurations providing data records to the analysis system may also be useful.

In one implementation, the analysis system includes a pre-processor module 325 and a processor module 335. The pre-processor module, for example, provide data services for pre-processing the data records. In one implementation, the pre-processor module pre-processes the data records to produce vehicle tracking tables. A tracking table is associated with a vehicle. For example, each vehicle is associated with its respective tracking table. In other implementations, the tracking data of all vehicles may be stored in a common tracking table. Other configurations of tracking table may also be useful.

The pre-processor cleans dirty data and matches a new (current) record with existing records, representing a transition of a vehicle from a previous sensor station to the next sensor station. Dirty data, for example, refer to data which is discarded. In one embodiment, data having a transition time between station pairs, such as S1 and S2, which exceed a threshold value is consider as dirty data and is discarded. The tracking tables, for example, contain entries which are direct transitions (without stopping) between station pairs. In one implementation, the threshold value is the same for all station pairs. Providing different station pairs with different threshold values may also be useful.

A record in a tracking table includes information on the vehicle's previous and next sensor stations. For example, a record represents a vehicle's transition from one sensor station to the next. Table 3 below shows an exemplary data structure of a tracking table:

TABLE 3

| Name | Type | Comment |
| --- | --- | --- |
| DEVID | VARCHAR | Identification for a car |
| CAP_TIME | SECONDDATE | The time when captured |
| NEXT_CAP_TIME | SECONDDATE | The time when captured next time |
| STATION_NO | VARCHAR | The Identification for the station |
| NEXT_STATION_NO | VARCHAR | The Identification for the next station |

FIG. 4 shows an exemplary embodiment of a vehicle data table 400 containing data records from a specified vehicle. As shown, the table lists temporally sequential records of a vehicle. The table includes records with vehicle id (DEVID), time of capture (CAP_TIME) and station id (STATION_NO). The vehicle id or license number of the vehicle is redacted. Other table formats may also be useful. For example, the table may include latitude and longitude information instead of, or in addition to, STATION_NO.

As shown, the vehicle data table is for a specific vehicle. For example, the vehicle data table is a specific vehicle data table. In such case, each vehicle is associated with its respective vehicle table. Providing a general vehicle data table containing data records for all vehicles may also be useful.

Figure 5:
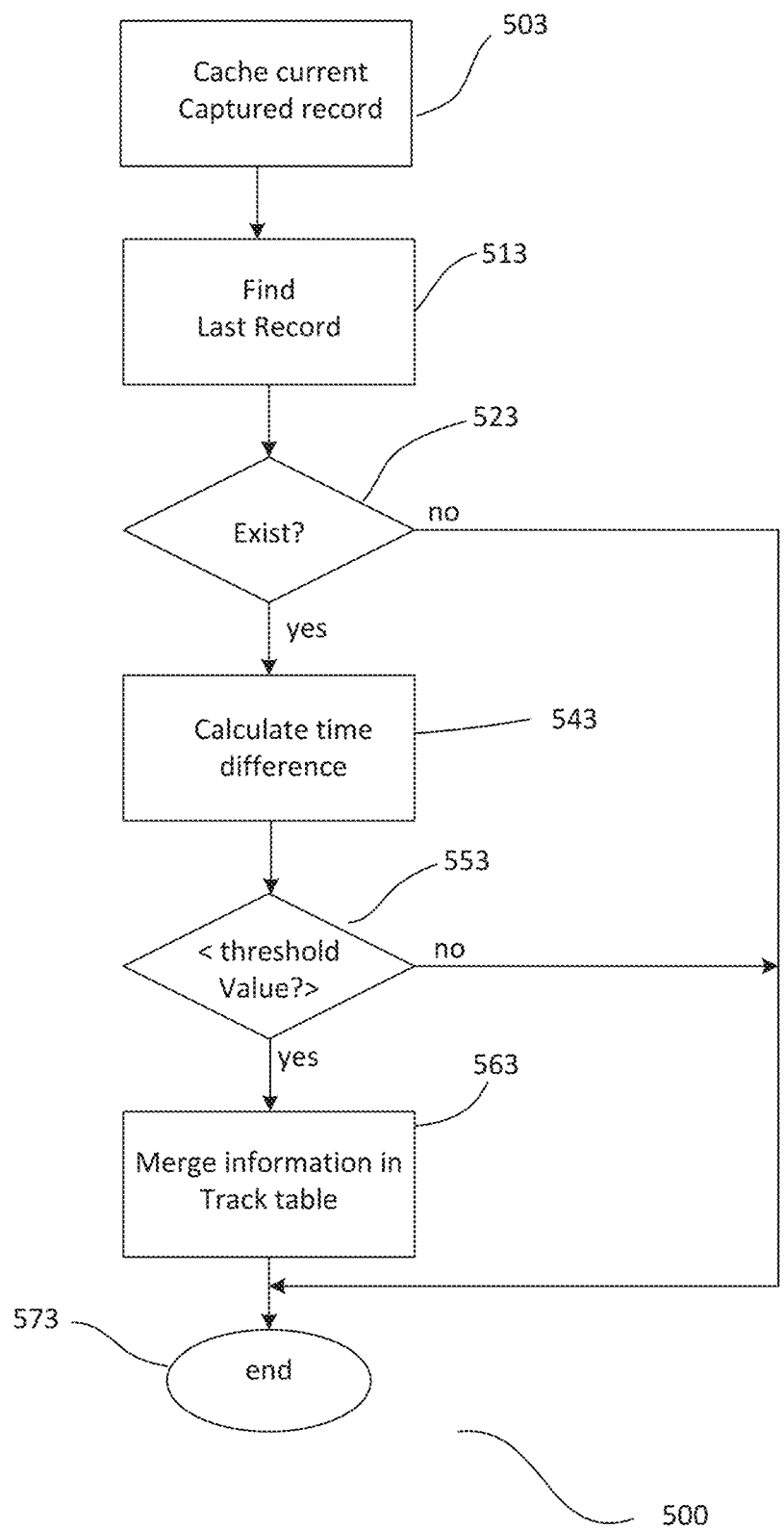
FIG. 5 shows an embodiment of a process for forming tracking tables.

FIG. 5 shows an embodiment of a process 500 by the pre-processor 325. The process is initiated whenever a new (current) record is received. When a new (current) record is received, it is cached at step 503. For example, the current record is stored in a vehicle data table. At step 513, the pre-processor determines if a previous record with the same vehicle id of the current record exists. For example, the vehicle data table is searched to determine if there are any records with the same vehicle id of the current record. If no previous record exists, the process proceeds to step 573 and terminates. If a previous record does exist, the process proceeds to step 543.

At step 543, the time difference between the previous captured record and current record is calculated. The time difference is compared with a threshold value at step 553. If the time difference is not less than the threshold value the current record is discarded and proceeds to step 573, where the process terminates. However, the current record is maintained in the vehicle data table. On the other hand, if the time difference is less than the threshold value, the process proceeds to step 563.

At step 563, a new tracking record is inserted into the tracking table. For example, a new tracking record may be inserted into the tracking table corresponding to the vehicle id. Alternatively, a new tracking record may be inserted into a general tracking table. The new record combines the information from the previous record with that of the current record with the same vehicle id. The previous record provides STATION_NO and CAP_TIME while the current record provides the NEXT_STATION_NO and NEXT_CAP_TIME of the new tracking record. Other techniques for forming tracking tables may also be useful. After inserting the new tracking record, the process terminates at step 573.

FIG. 6 shows an exemplary tracking table 600 containing data records from a specified vehicle. An entry includes vehicle id (DEVID), capture time of previous record (CAP_TIME) and capture time of current record (NEXT_CAP_TIME) and previous sensor station (STATION_NO) and current sensor station (NEXT_STATION_NO). The vehicle id or license number of the vehicle is redacted. As previously discussed, tracking table may include latitude and longitude information instead of or in addition to STATION_NO. Other tracking table formats may also useful. For example, the tracking table may include latitude and longitude information instead of or in addition to STATION_NO and NEXT_STATION_NO.

Referring back to FIG. 3, the processor module 335 includes various modules for analyzing the pre-processed data records to identify, for example, parking locations of a vehicle of interest. In one implementation, the processor module includes a database, such as SAP HANA from SAP SE. Other types of processors or databases may also be useful. The processor includes a data model module 345, an analyzer module 375 and an interface module 385. Providing other types of modules may also be useful. For example, the modules may include persistent layer, calculation engine and XS engine as well as other modules available in SAP HANA.

In one implementation, the data model module stores the tracking tables 355 created and updated by the pre-processor. The data model module, as shown, further includes geographical table 365 with geographic data records such as sensor station records as described in Table 2. In some cases, the tracking tables 355 may include geographical information, avoiding the need for separate geographical table. In one implementation, the threshold value is the same for all station pairs. Providing different station pairs with different threshold values may also be useful.

In one implementation, the analyzer module 375 analyzes the data model to produce parking areas which a vehicle of interest may have parked during a terminal segment. Instructions from a user, such as an administrator, may include a station pair of interest and time of interest. For example, a first sensor station $S_1$ and time of capture by $S_1$ as well as a second sensor station $S_2$ and time of capture by $S_2$. The first station is the station from which a vehicle is traveling while the second station is to which the vehicle is traveling. Based on the parameters provided, the analyzer identifies interstation parking areas during the time frame of interest. In other cases, the analyzer may identify interstation parking areas between the station pair of interest.

The instructions may be provided through a web browser 395 on an end-user device. The browser may include a user interface for entering the desired information. The instructions are passed from the browser to the interface module 385 in the processor. The interface module, for example, may be an extended service (XS) engine of the SAP HANA database. Other types of interface modules may also be useful. The interface module facilitates communication between the browser on the end-user device and the processor.

Figure 7:
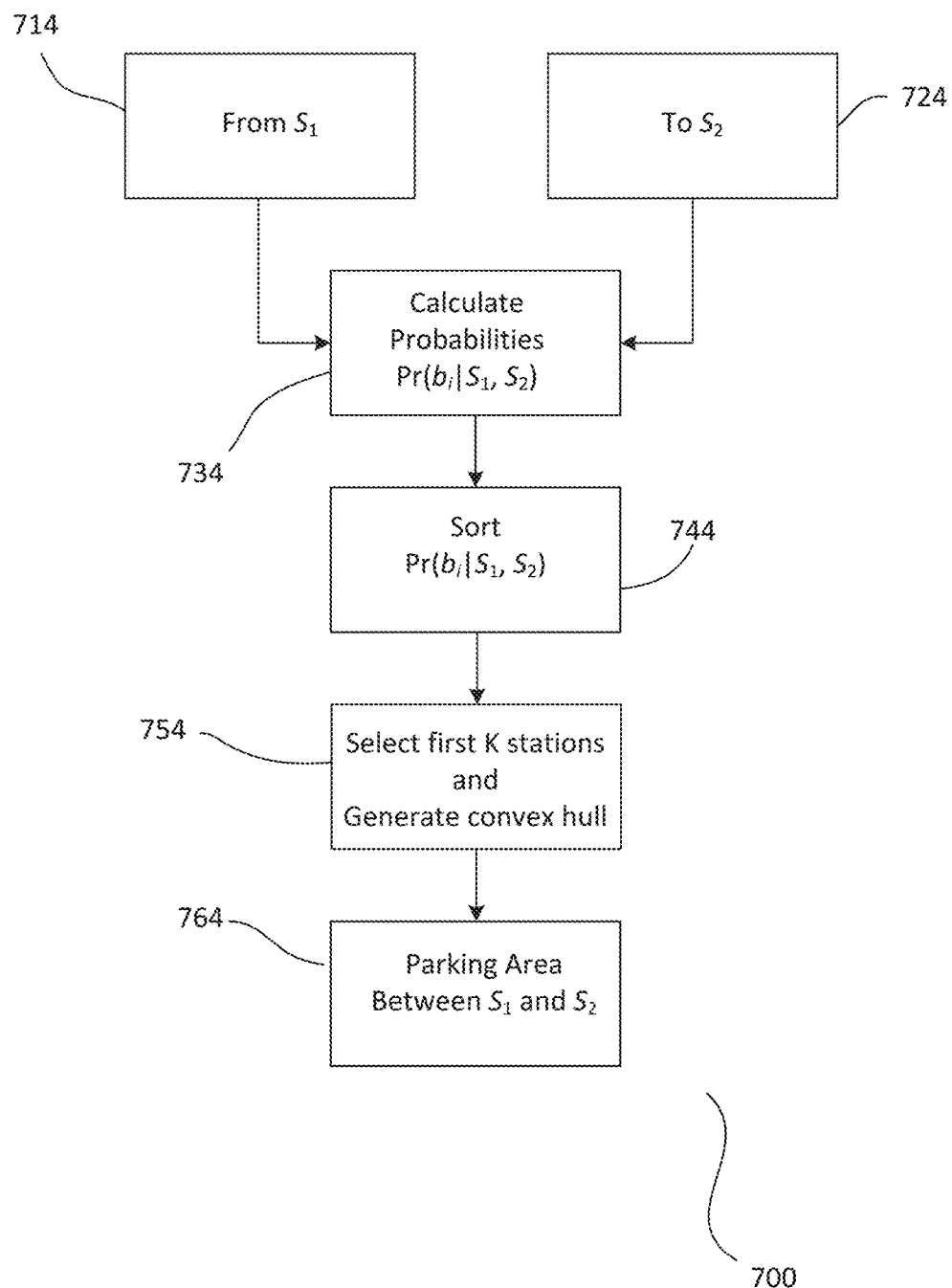
FIG. 7 shows an analysis process performed by an analyzer.

FIG. 7 shows an analysis process 700 performed by the analyzer module 375. As shown, first and second parameters are provided at steps 714 and 724. Although the parameters are shown to be provided in separate steps, it is understood that the parameters may be provided in the same step. In one implementation, the parameters are sensor station pairs of interest. For example, interstation parking areas between a station pair are identified. The first parameter is the first sensor station $S_1$ of the pair, which is the from sensor station while the second sensor station $S_2$ is the second parameter. For example, a vehicle is traveling from sensor station $S_1$ to sensor station $S_2$ and has stopped in between them.

At step 734, the analyzer calculates the probabilities $Pr(b_i|S_1,S_2)$, where $S_1$ is the first sensor station of the station pair $S_2$ is the second sensor station of the station pair, and $b_i$ is an intermediate sensor station (any other sensor station other than $S_1$ to $S_2$).

Suppose the set of sensor stations S is equal to $\{S_1, S_2, \ldots, S_N\}$, where N is the total number of stations. The set of sensor stations is partitioned into two disjoint subsets, $A_1=\{S_1,S_2\}$ and $A_2=S\backslash A_1$ with N−2 elements. For any $b_i \in A_2$, i=1, ... N−2, find the transition probability from $S_1$ to $S_2$ via $b_i$, $Pr(b_i|S_1, S_2)$, according to Bayes formula (equation 1) below:

$$Pr(b_i|S_1,S_2) \alpha Pr(b_i|S_1) \cdot Pr(S_2|S_1,b_i) \quad \text{(equation 1)}$$

where $Pr(b_i|S_1)$ denotes the transition probability from station $S_1$ to station $b_i$, and $Pr(S_2/S_1,b_i)$ denotes the probability of going to $S_2$ given the two preceding stations $S_1$ and $b_i$.

Both probabilities can always be learned or determined from historical data. In one implementation, the transition probability from $S_1$ and $b_i$ may be determined by:

$$Pr(S_j | S_i) = \frac{N_{i \to j}}{N_i}$$

As for the transition probability of going to $S_2$ given the two preceding stations $S_1$ and $b_i$, it may be determined by:

$$Pr(S_k | S_i, S_j) = \frac{N_{i \to j \to k}}{N_{i \to j}}$$

where $N_i$ is the number of vehicles recorded at station $S_i$, $N_{i \to j}$ is the total number of vehicles travelling directly from station $S_i$ to station $S_j$, and $N_{i \to j \to k}$ is the total number of vehicles travelling sequentially as $S_i \to S_j \to S_k$.

The variable k is an arbitrary index for a station other than the $i^{th}$ and $j^{th}$ stations. All permutations of (i, j, k) triplet may be calculated. Alternatively, an approximation may be made, avoiding calculating this quantity.

The calculations may be simplified. In one implementation, the calculations are simplified by using a one-step transition probability to approximate $Pr(b_i|S_1,S_2)$. For example, the one-step transition assumes $Pr(S_2|S_1,b_i)$ $Pr(S_2|b_i)$. This is equivalent to assuming a first-order Markov chain model on the station network. As such, the probabilities $Pr(b_i|S_1,S_2)$ are calculated for all $b_i \in A_2$, where i=1, ... N−2.

At step 744, the probabilities $Pr(b_i|S_1,S_2)$ are sorted. For example, the probabilities $Pr(b_i|S_1,S_2)$ for $b_i \in A_2$, where i=1, ... N−2, are sorted. In one implementation, the probabilities are sorted in descending order. For example, the probabilities are sorted according to equation 2 below:

$$Pr(b_{i_{N-2}}|S_1,S_2) \geq \ldots \geq Pr(b_{i_{N-k}}|S_1,S_2) \geq \ldots \geq Pr(b_{i_1}|S_1,S_2) \quad \text{(equation 2)}$$

After sorting the probabilities the analyzer selects first K stations at step 754. The value K is determined by equation 3 below:

$$K=\max\{\theta_1, \text{argmin}_K[\Sigma_{k=0}^K Pr(b_{i_{N-2}}|S_1,S_2) \geq \theta_2]\} \quad \text{(equation 3)}$$

where $\theta_1$ is the maximum number of stations enclosing the parking region, $\theta_2$ is the threshold for accumulative probability of the first K. In one implementation, $\theta_1$ is fixed at 10 while $\theta_2$ is fixed at 0.9. Fixing $\theta_1$ and $\theta_2$ at other values may also be useful. Larger values will result in larger areas in which parking areas are located while the inverse is true for smaller values.

A convex hull is generated. The convex hull indicates the parking areas or stopping regions between $S_1$ and $S_2$. In one implementation, the convex hull is generated by initially determining a set of points. The set of points, for example, is determined by $\{S_1,S_2\} \cup B_K$, where $B_K=\{b_{i_{N-2}}, \ldots, b_{n-K-2}\}$. The set of points is used to generate the convex hull. The convex hull is a convex polygon enclosing the set of points. For example, the convex hull is the smallest convex set that contains the set of points. Various techniques may be used to determine the convex hull from the set of points. After determining the convex hull, parking areas in the convex hull are displayed at step 764. For example, the convex hull is overlaid onto a map between stations S1 and S2. The map with the convex hull is displayed.

Figure 8:
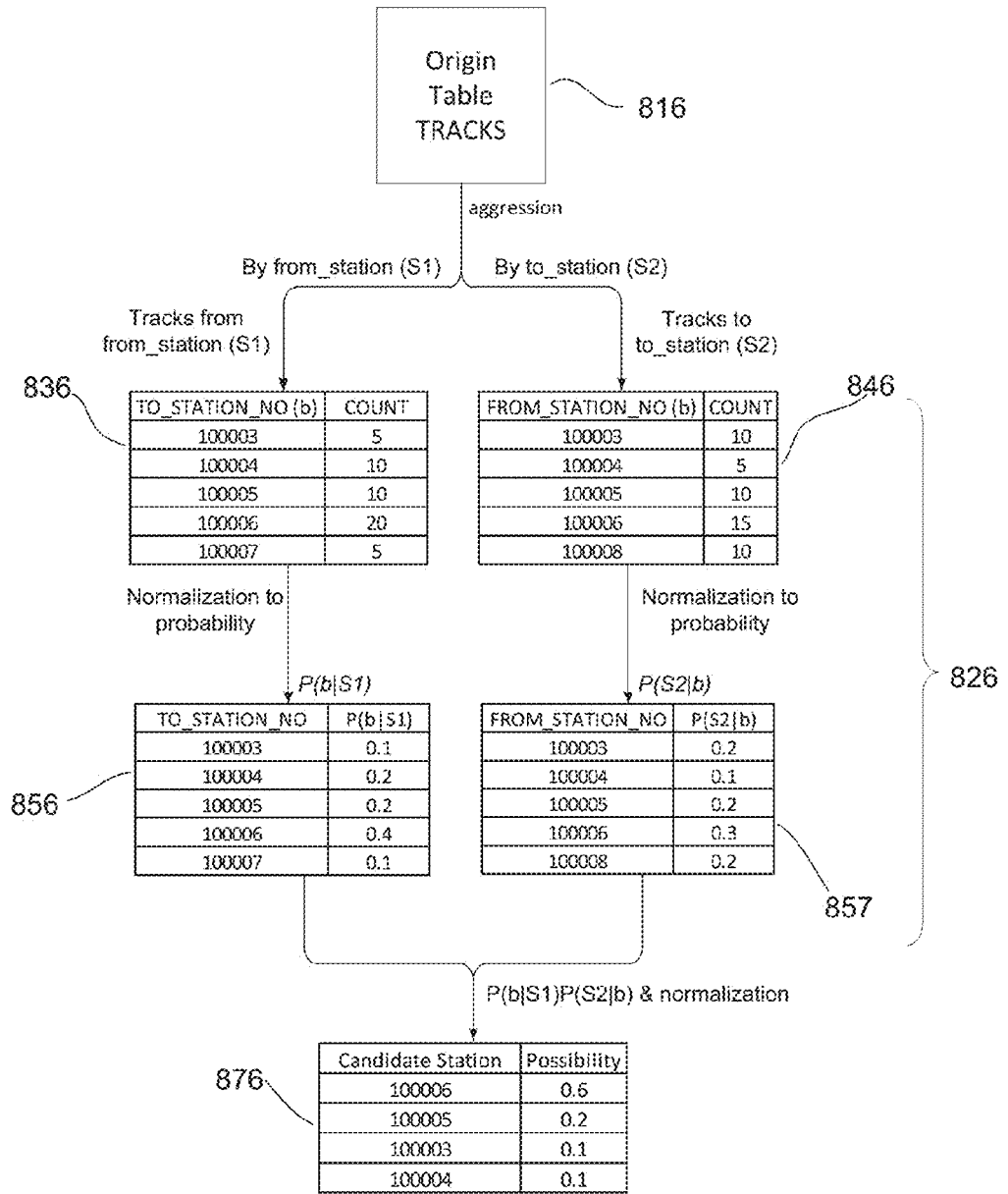
FIG. 8 illustrates a simple example of a portion of an embodiment of a process for identifying parking areas.

FIG. 8 illustrates a simple example of a portion of an embodiment of a process 800 for identifying parking areas. Based on input parameters from the user, the analyzer searches the tracking tables 816 in the data model module. The input parameters, for example, may include first sensor station $S_1$ and a second sensor station $S_2$. The first sensor station may be referred to as the from_station and the second sensor station may be referred to as the to_station. The input parameters may also include time of capture at $S_1$ (S1_time) and time of capture at $S_2$ (S2_time). The time period from, S1_time to S2_time may be referred to as the time frame of interest. The analyzer commences determining probabilities $Pr(b_i|S_1,S_2)$ at step 826. For example, the probabilities are determined using equation 1.

Prior to calculating the probabilities, the number of tracks that are "from" station $S_1$ and the number of tracks "to" station $S_2$ are determined. In the case of "from" $S_1$, the system searches tracking tables, as described in FIG. 6, in which $S_1$ is the STATION_NO. The NEXT_STATION_NO in the tracking table corresponds to $b_i$. The records in the tracking tables having STATION_NO as $S_1$ are grouped based on NEXT_STATION_NO (e.g., b) and counted. This provides the count of records in which $S_1$ is the FROM_STATION, as shown in step 836. In the case of "to" $S_2$, the system searches tracking tables in which $S_2$ is the NEXT_STATION_NO. The STATION_NO in the tracking table corresponds to $b_i$. The records in the tracking tables having NEXT_STATION_NO as $S_2$ are grouped based on STATION_NO (e.g., b) and counted. This provides the count of records in which $S_2$ is the TO_STATION, as shown in step 846. In one implementation, the records have capture time within the time frame of interest. In other implementations, the records may include any capture time.

After determining the track counts from or to $b_i$, probabilities $P(b_i|S_1)$ and $P(S_2|b_i)$ are calculated in steps 856 and 857. These probabilities are normalized. For example, the total probability of all intermediate stations from $S_1$ is equal to 1 and the total probability of all intermediate stations to $S_2$ is equal to 1. The probabilities $P(b|S_1)$ and $P(S_2|b)$ are sorted at step 876. The probabilities are sorted using, for example, equation 3. In one implementation, the probabilities are sorted in a descending order. For example, higher probabilities are listed prior to lower probabilities.

The process may continue as described to determine K and to generate a convex hull. Parking areas are identified with in the convex hull between $S_1$ and $S_2$.

As discussed, a request may be sent to the analyzer from the browser. The analyzer may be implemented with SAP HANA. The browser (or frontend) request may include parameters such as from_station, from_time, to_station and to_time. The from_station parameter may be $S_1$, the from_time parameter may be $S_1$ time, the to_station parameter may be $S_2$ and the to_time may be S2_time. The backend SQL Script is called by the service exposed by the XS Engine, and returns the parking area as a polygon to the frontend.

A JSON example of the request is shown below:

```
Request
{
    "fromStation":"00000009"
    "fromStationTime":"11:00:00"
    "toStation":"00000001"
    "toStationTime":"13:00:00"
}
Response
{
    "errCode":0,
    "errDesc":"",
    "result":{
    "polygon":[[[119,29],[118.30],[117.30],[119,29]]]
}
}
```

Figure 9:
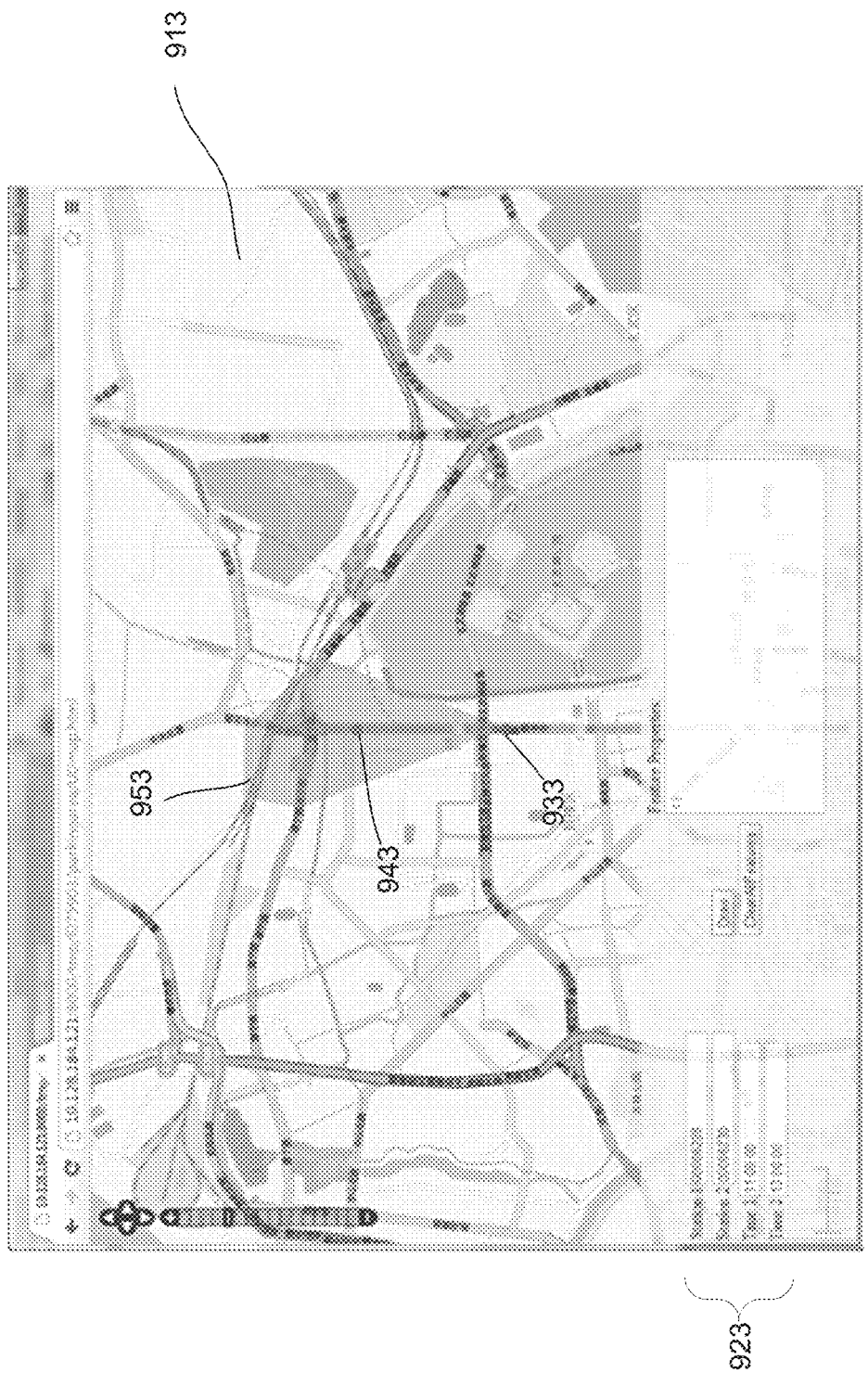
FIG. 9 shows a screenshot illustrating an exemplary output of an analyzer.

FIG. 9 shows a screenshot illustrating an exemplary output 900 of an analyzer. As shown, a user interface of a browser on an end-user device includes a main panel. The main panel displays a map 913 of a geographic area of interest. The main panel includes a parameter box 923, showing the input parameters, such as station 1, time 1, station 2 and time 2. The map covers station 1 and station 2. Station 1, for example, is the from_station and station 2 is the to_station. The convex hull 953 overlays an area in which parking areas are identified.

As described, the various modules of the analysis system may be embodied as an application. For example, the various modules may be embodied as a software application. The modules may be integrated into an existing software application, as an add-on or plug-in to an existing application or as a separate stand-alone application. The source code of the application may be compiled to create an executable code. The codes, for example, may be stored in a storage medium such as one or more storage disks. Other types of storage media may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method for identifying parking areas comprising:
   providing vehicle trajectory data of vehicles collected from a sensor network having a plurality of sensor stations for detecting vehicles, the sensor stations of the sensor network are distributed in a geographical area of interest, the vehicle trajectory data is stored as vehicle trajectory data records in a vehicle trajectory table, wherein a vehicle trajectory data record of the vehicle trajectory data comprises,
      a vehicle id identifying the vehicle detected,
      a sensor station id identifying the sensor station detecting the vehicle, and
      a captured time which is the time that the sensor station detected the vehicle;
   pre-processing the vehicle trajectory data records by an analysis system to generate a tracking table of vehicles;
   storing the tracking table in a data model of an analyzer of the analysis system;
   analyzing the data model to determine an interstation parking area between first and second sensor stations of interest identified based on input parameters from a user, wherein the interstation parking area represents a probable stopping region of a vehicle of interest and is determined by calculating, from the data model, transition probabilities from the first sensor station to the second sensor station via one or more intermediate sensor stations; and displaying the interstation parking area at a user interface.

2. The computer-implemented method of claim 1 wherein pre-processing the vehicle trajectory data comprises discarding dirty data records of the vehicle trajectory data, wherein a dirty data record is a vehicle trajectory record having a difference in capture time with a capture time of a previous vehicle trajectory data record with the same vehicle id is greater than a threshold value.

3. The computer-implemented method of claim 2 wherein the tracking table comprises a plurality of tracking tables based on vehicle id.

4. The computer-implemented method of claim 1 wherein pre-processing the vehicle trajectory data comprises:
   discarding dirty data records, wherein a dirty data record is a vehicle trajectory record having a difference in capture time with a capture time of a previous vehicle trajectory data record with the same vehicle id is greater than a threshold value; and
   wherein the tracking table comprises a plurality of tracking tables based on vehicle id.

5. The computer-implemented method of claim 1 wherein a process of generating the tracking table comprises:
   caching a current vehicle trajectory data record received;
   searching the vehicle trajectory table to determine if a previous vehicle trajectory data record with the same vehicle id as that of the current vehicle trajectory data record exist;
   if the previous vehicle trajectory data record does not exist, terminate the process;
   if the previous vehicle trajectory data record does exist, calculate the time difference between a current_captured time of the current vehicle trajectory data record with a last_captured time of the previous vehicle trajectory data record;
   if the difference between the current_captured time and the last_captured time is not less than a threshold value, the process terminates; and
   if the difference between the current_captured time and the last captured time is less than a threshold value, the current vehicle trajectory data record is processed to form a tracking table record,
   inserting the tracking table record into the tracking table, and
   the process terminates.

6. The computer-implemented method of claim 5 wherein the tracking table comprises a plurality of tracking tables based on vehicle id.

7. The computer-implemented method of claim 5 wherein a tracking record in the tracking table comprises:
   the vehicle id identifying the vehicle detected;
   a previous sensor station id of the previous vehicle trajectory data record;
   the previous_captured time of the previous vehicle trajectory data record;
   the current_sensor station id of the current vehicle trajectory data record; and
   the current_captured time of the current vehicle trajectory data record.

8. The computer-implemented method of claim 7 wherein the tracking table comprises a plurality of tracking tables based on vehicle id.

9. The computer-implemented method of claim 1 wherein a tracking record in the tracking table comprises:
   the vehicle id identifying the vehicle detected;
   a from_sensor station id identifying a from sensor station detecting the vehicle;
   a from_captured time which is the time that the from sensor station detected the vehicle;
   a to_sensor station id identifying a to sensor station detecting the vehicle; and
   a to_captured time which is the time that the to sensor station detected the vehicle.

10. The computer-implemented method of claim 9 wherein tracking records in the tracking table comprises a difference between the from_capture time and the to_capture time is less than a threshold value.

11. The computer-implemented method of claim 10 wherein the tracking table comprises a plurality of tracking tables based on vehicle id.

12. The computer-implemented method of claim 1 wherein the sensor stations comprise fixed traffic sensors, wherein a fixed sensor station comprises a radio-frequency identification (RFID) sensor, a license plate recognition (LPR) sensor or both.

13. The computer-implemented method of claim 1 wherein identifying parking areas further comprises identifying interstation parking areas between first and second contiguous sensor stations of a set of stations.

14. The computer-implemented method of claim 13 comprises determining a convex hull surrounding the first and second contiguous sensor stations, wherein the parking areas are disposed within the convex hull.

15. The computer-implemented method of claim 13 wherein identifying the interstation parking areas between the first and second contiguous sensor stations of a set of stations comprises:
   calculating probabilities $Pr(b_i|S_1,S_2)$ for $b_i \in A_2$, where $i=1, \ldots N-2$;
   sorting the probabilities $Pr(b_i|S_1,S_2)$; and
   selecting first K stations based on
   $$K=\max\{\theta_1, \operatorname{argmin}_K[\Sigma_{k=0}^{K} Pr(b_{i_{N-k-2}}|S1,S2) \geq \theta_2]\}.$$

16. The computer-implemented method of claim 15 comprises determining a convex hull surrounding the first and second contiguous sensor stations in which the parking areas are disposed, where determining the convex hull comprises determining a set of points by $\{S_1,S_2\} \cup B_K$, where $B_K=\{b_{i_{N-2}}, \ldots, b_{n-K-2}\}$, wherein the set of points is used to generate the convex hull to form a convex polygon enclosing the set of points.

17. A parking area analysis system comprising:
   a data storage module for storing a vehicle trajectory table, the vehicle trajectory table includes vehicle trajectory data records collected from a sensor network having a plurality of sensor stations for detecting vehicles, the sensor stations of the sensor network are distributed in a geographical area of interest, wherein a vehicle trajectory data record comprises,
   a vehicle id identifying the vehicle detected,
   a sensor station id identifying the sensor station detecting the vehicle, and
   a captured time which is the time that the sensor station detected the vehicle;
   a pre-processor for analyzing the vehicle trajectory data set to generate a tracking table of vehicles, wherein the tracking table is stored in a data model;
   an analyzer for analyzing the data model to determine an interstation parking area between first and second sensor stations of interest identified based on input parameters from a user, wherein the interstation parking area is disposed within a convex hull surrounding the first and second sensor stations, wherein the interstation parking area represents a probable stopping region of a vehicle of interest and is determined by calculating, from the data model, transition probabilities from the first sensor station to the second sensor station via one or more intermediate sensor stations; and a display device that displays the interstation parking area.

18. The system of claim 17 wherein a tracking record in the tracking table comprises:

the vehicle id identifying the vehicle detected;

a from_sensor station id identifying a from sensor station detecting the vehicle;

a from_captured time which is the time that the from sensor station detected the vehicle;

a to_sensor station id identifying a to sensor station detecting the vehicle; and a to_captured time which is the time that the to sensor detected the vehicle.

19. A non-transitory computer-readable medium having stored thereon a program code, the program code executable by a computer for identifying parking areas comprising:

providing vehicle trajectory data of vehicles collected from a sensor network having a plurality of sensor stations for detecting vehicles, the sensor stations of the sensor network are distributed in a geographical area of interest, the vehicle trajectory data is stored as vehicle trajectory data records in a vehicle trajectory table, wherein a vehicle trajectory data record of the vehicle trajectory data comprises, a vehicle id identifying the vehicle detected, a sensor station id identifying the sensor station detecting the vehicle, and a captured time which is the time that the sensor station detected the vehicle;

pre-processing the vehicle trajectory data records to generate a tracking table of vehicles;

storing the tracking table in a data model of an analyzer of the analysis system;

analyzing the data model to determine an interstation parking area between first and second sensor stations of interest identified based on input parameters from a user, wherein the interstation parking area is disposed within a convex hull surrounding the first and second sensor stations, wherein the interstation parking area represents a probable stopping region of a vehicle of interest and is determined by calculating, from the data model, transition probabilities from the first sensor station to the second sensor station via one or more intermediate sensor stations; and displaying the interstation parking area at a user interface.

20. The non-transitory computer-readable medium of claim 19 wherein the convex hull is determined by:

calculating probabilities $Pr(b_i|S_1,S_2)$ for $b_i \in A_2$, where i=1, . . . N−2;

sorting the probabilities $Pr(b_i|S_1,S_2)$; and selecting first K stations based on $$K=\max\{\theta_1, \mathrm{argmin}_K[\Sigma_{k=0}^K Pr(b_{i_{N-k-2}}|S1,S2) \geq \theta_2]\}.$$

* * * * *